United States Patent [19]

McShane

[11] 4,356,999

[45] Nov. 2, 1982

[54] PORTABLE FENCING

[76] Inventor: Peter F. McShane, "Woodspring" Bothwell, Tasmania 7411, Australia

[21] Appl. No.: 645

[22] Filed: Jan. 2, 1979

[51] Int. Cl.³ .............................................. E04H 17/16

[52] U.S. Cl. ......................................... 256/26; 256/73

[58] Field of Search ................... 256/25, 26, 27, 1, 73; 119/20

[56] References Cited

U.S. PATENT DOCUMENTS

| | | | |
|---|---|---|---|
| 63,828 | 4/1867 | Augspurger | 256/26 |
| 159,952 | 2/1875 | McQuary | 256/28 |
| 765,729 | 7/1904 | Graham | 256/29 |
| 1,458,260 | 6/1923 | Wilson | 256/27 |
| 3,204,606 | 9/1965 | Parr | 119/20 |
| 3,767,167 | 10/1973 | Rasmussen | 256/26 |
| 3,770,246 | 11/1973 | Key | 256/25 |
| 3,815,877 | 6/1974 | Turner | 256/25 |

FOREIGN PATENT DOCUMENTS

| | | | |
|---|---|---|---|
| 245867 | 8/1963 | Australia | 256/25 |
| 54006 | 7/1967 | Australia . | |
| 424496 | 6/1972 | Australia . | |
| 85393 | of 1975 | Australia . | |
| 1064192 | 4/1967 | United Kingdom . | |
| 1480933 | 4/1977 | United Kingdom . | |

*Primary Examiner*—Andrew V. Kundrat

*Attorney, Agent, or Firm*—Biebel, French & Nauman

[57] ABSTRACT

A portable fence and a trailer for unloading the fence and reloading the fence are disclosed. The fence includes at least two fence sections connected end to end. Stop means are provided to limit the amount of swing between fence sections at the connected end. Remote ends of the fence sections have components of hinge means which allows unrestricted rotation at the remote ends when such are connected together. The stop means and the hinge components which allows unrestricted rotation allow the fence to take up a self supporting V-shape when placed on the ground.

The trailer has two housing portions to allow the trailer to be towed both forwardly and reversely. The trailer has rollers at one end which are driven from the rotatable wheels of the trailer to assist in the loading and unloading of the fence to and from the trailer.

24 Claims, 15 Drawing Figures

8 4 36 26 9 6 42 22 24 30 32 40 10 38 34 10 28 22 7 7 30 17 24 13

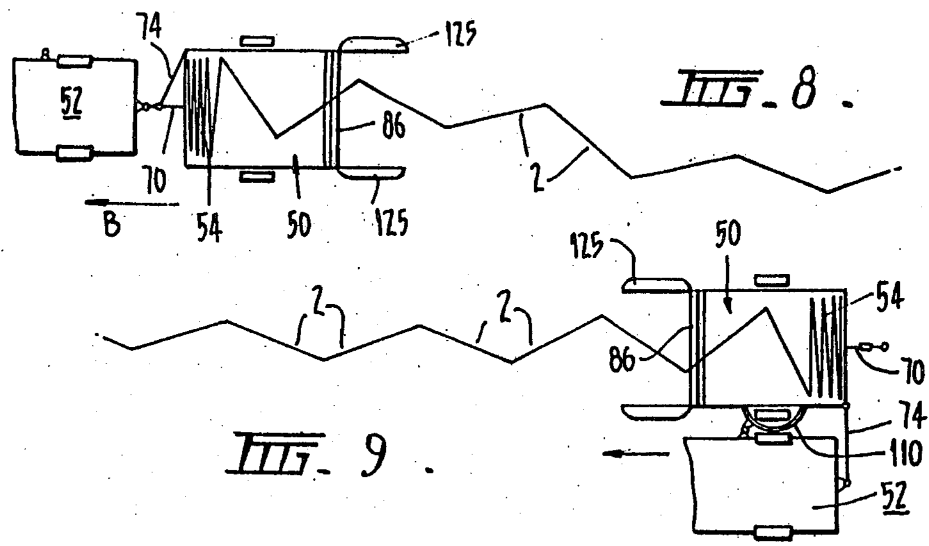
74
125
52
86
2
70
B
54
50
125
FIG. 8.
125
50
54
2
2
86
70
74
110
52
FIG. 9.
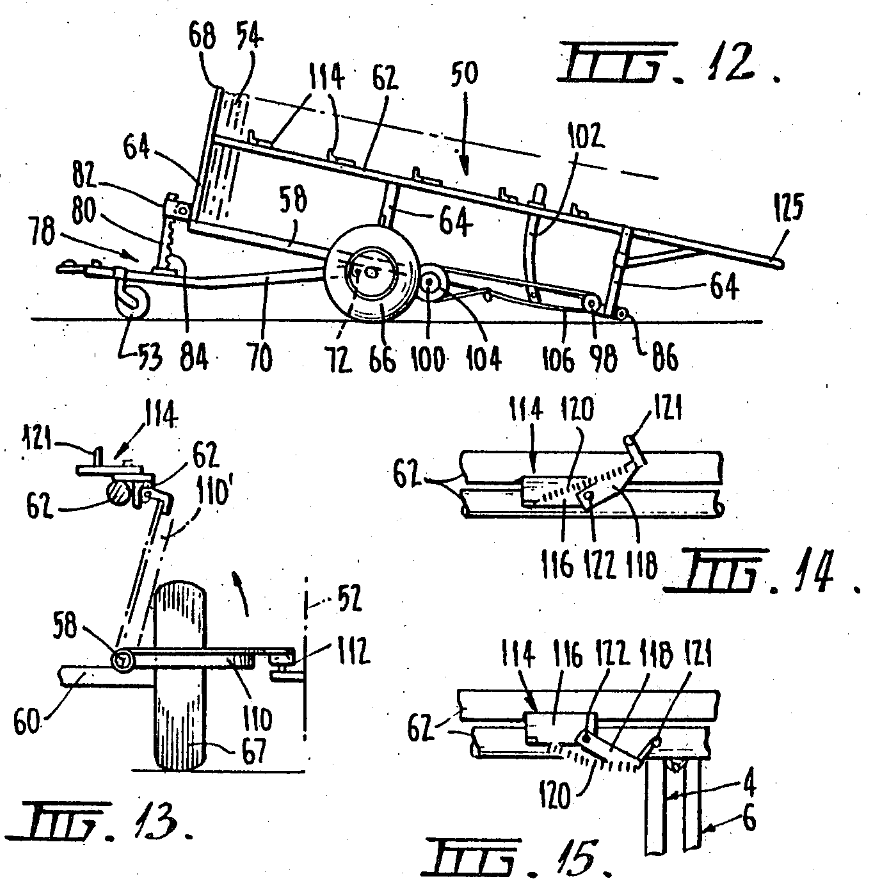
68
54
114
62
50
FIG. 12.
64
102
82
80
58
64
125
78
64
53
84
70
72
66
100
104
106
98
86
114
121
62
110'
62
58
52
112
60
110
67
FIG. 13.
114
120
121
62
116
122
118
FIG. 14.
114
116
122
118
121
62
4
120
6
FIG. 15.

50
67
110'
62
94
90
64
92
125
76
114
74
58
88
86
60
78
70
72
B
52
70
68
54
60
58
104
125

114
62
66
100
102
106
98
125
106
102
100
66
114
62
12
12
68
54
58
60
70
53
86
60
88
13
13
90
62
67
114
110
112
52
76
74

PORTABLE FENCING

This invention relates to fencing and more particularly to portable fencing units which may be used to form yards for containing animals such as sheep.

Previously numerous types of portable fencing have been proposed for forming sheep yards. One type comprises a plurality of light and flexible fence sections which are held rigid and upright by steel posts. Although the light and flexible fence sections are readily moved to and from the location of the sheep yard, once the yard has been erected the design of the yard can only be altered by first extracting the posts and moving the gates to their new position. Further the task of erecting the yard and disassembling the same is extremely time consuming.

A second type of fencing hitherto employed comprises heavy rigid fence sections which require considerable time and labor to load and unload from trucks for transportation to and from the site of the yard. This tends to limit the size of the yards which may be economically and rapidly erected and steel posts may still be required to maintain the fence sections upright.

There has therefore been a need for a portable fencing arrangement which is easy and economical to transport and erect.

The present invention provides a fence unit including at least two generally planar fence sections, said at least two fence sections being swingably connected end to end by connecting means along ends which, in use, are to be upright, one of said fence sections having stop means for limiting the amount of relative swing between the at least two fence sections whereby in use, when said fence sections are opened to the limit allowed by said stop means, said fence unit has a v-shape such that the fence unit is self supporting when placed on the ground.

Preferably said stop means comprises a rod attached along the end of the said one fence section such that when said at least two fence sections swing relative to one another into an open position said rod abuts against an adjacent end of the adjacent fence section to limit the amount of relative swing between the at least two fence sections.

A number of such fence units may be connected end to end preferably by means which will allow the fence units to swing relative to each other, to form a portable fence.

The present invention further provides a method for erecting a fence of the type defined in anyone of claims 14 to 16 comprising the steps of loading said fence folded into a concertina arrangement onto a trailer, placing a portion of said fence onto the ground and towing said trailer such that said fence is dragged from the rear of said trailer onto the ground in a self supporting zig-zag arrangement.

The preferred embodiment of the invention shall be described with reference to the accompanying drawings in which.

Figures 1, 2, 3, 4, 5, 6, 7:
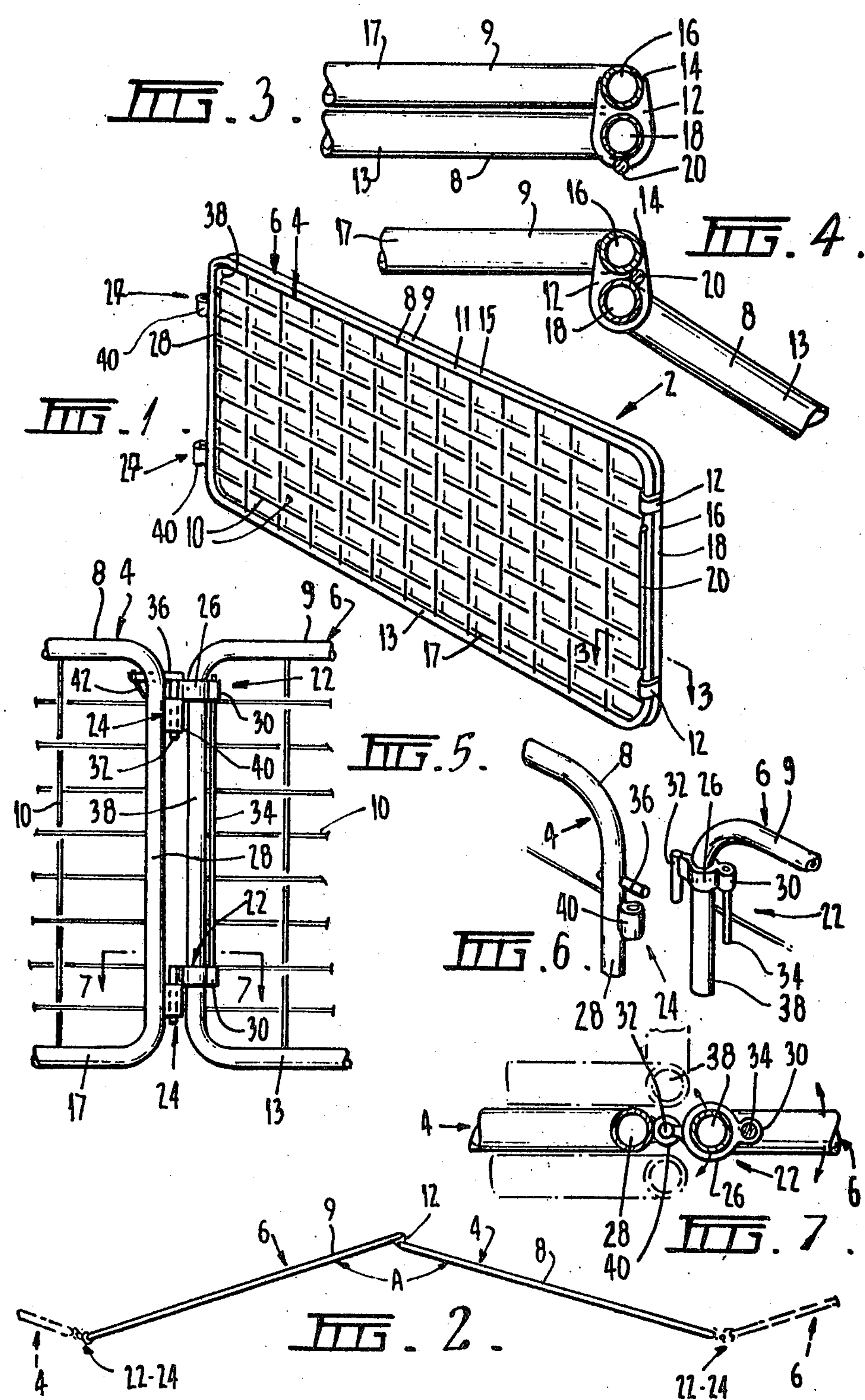
FIG. 1 shows a fence unit in the fully folded position.
FIG. 2 shows a plan view of the fence unit in the fully open position.
Figures 10, 11:
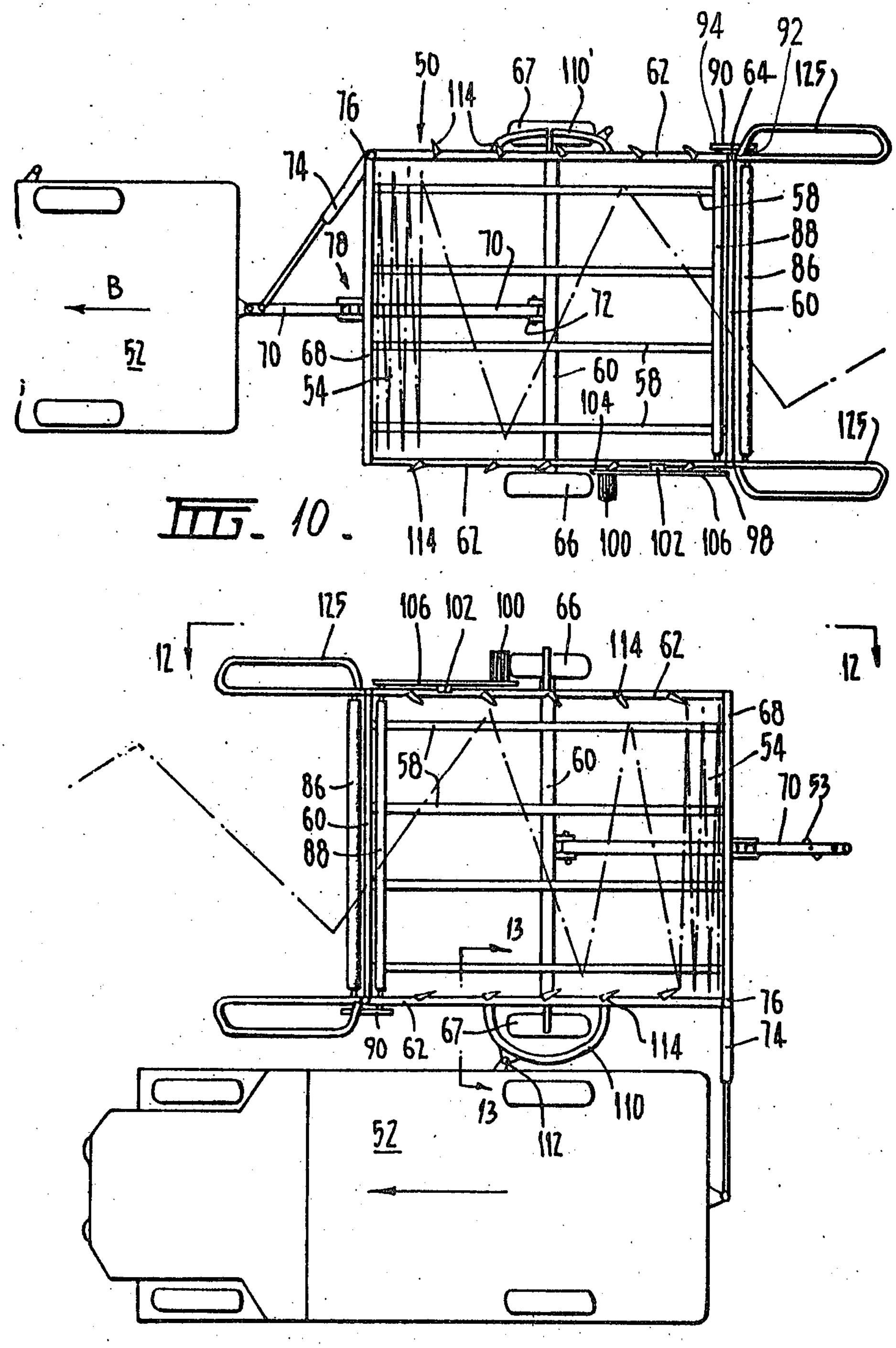

FIG. 3 shows a view along the line 3—3 of FIG. 1 of the connecting means and stop means of the fence unit, FIG. 4 shows the connecting means and stop means of FIG. 3 with the fence sections in the fully open position, FIGS. 5 and 6 show the manner in which the fence units are releasably connected together so that fence units may be joined to form a fenced yard, FIG. 7 shows a view along the line 7—7 of FIG. 5, FIG. 8 shows a schematic diagram of the manner in which the fence is unloaded from a trailer, FIG. 9 shows a schematic diagram and the manner in which the fence is loaded onto a trailer, FIG. 10 shows a plan view of the trailer, in the unload position, FIG. 11 shows a plan view of the trailer in the load position, FIG. 12 is a side elevation of the trailer along the line 12—12 of FIG. 11, FIG. 13 is a view of the second connection means of the trailer taken along the line 13—13 at FIG. 11.

FIG. 14 shows a plan view of a member for holding the fence on the trailer said member being in the open position.

FIG. 15 has a plan view similar to FIG. 14 but with the member for holding the fence on the trailer in the closed or holding position.

Referring to FIG. 1 a fence unit 2 is shown in the fully closed or folded position and comprises two fence sections 4 and 6. The fence sections 4 and 6 each comprise a substantially rectangular frame 8 and 9 respectively formed of tubular pipe each of which holds a panel of wire mesh 10. The frame 8 comprises an inner upright portion 18, a remote upright portion 28 and upper and lower horizontal portions 11 and 13. The frame 9 comprises an inner upright portion 16, a remote upright portion 38 and upper and lower horizontal portions 15 and 17. The fence sections 4 and 6 are generally planar and are connected at one end by two hinges 12. The hinges 12 are substantially u-shaped members which are welded at their open end 14 onto the upright portion 16 of the frame 9 of fence section 6 and enclose upright portion 18 of the frame 8 the other fence section 4. A sleeve (not shown) may be provided within the hinge 12 which encloses the upright portion 18 between the hinge so that the two fence sections 4 and 6 are snugly held by the hinge 12 in a manner which allows the upright 18 to rotate within the hinge so that the fence sections 4 and 6 may swing relative to each other.

A stop member in the form of a rod 20 is connected by welding to the upright 18 of frame 8 of the fence section 4 between the hinges 12.

The rod 20 is preferably welded onto a portion of upright 18 at a location which will allow the upright to rotate through about 160° before abutting the upright 16 of fence section 6 and thereby prevent further opening of the fence sections 4 and 6.

The fence section 4 and 6 may therefore swing relative to each other from the fully closed position (FIG. 1) to a fully open position (FIG. 2) where the rod 20 abuts the upright 16 of the fence section 6.

As best seen in FIG. 2 when the fence section 4 and 6 are in the fully open position they form a v-shape which opens to an angle A of 160°. When in an open position the fence unit 2 comprising the fence section 4 and 6 is fully self supporting.

The fence unit 2 also has cooperating hinge components 22 and 24 (as best shown in FIGS. 5 to 7) at the ends of the fence sections 6 and 4 on remote upright portion 38 and remote upright portion 28 respectively. The hinge components 22 and 24 are provided so that a plurality of fence units may be releasably connected to form a portable fence. Fence units may therefore be conveniently added or removed from an existing portable fence to alter the size thereof.

Hinge component 22 which is provided on fence section 6 comprises a pair of annular members 26 vertically spaced apart on the upright 38 of frame 9 of fence section 6. The annular members 26 encircle upright 38 for relative rotation with upright 38. The sleeves 26 have an eyelet 30 at one side thereof and a connecting pin 32 which is secured to and projects downwardly from the opposite side thereof.

The pair of hinge components 22 are spaced vertically apart on upright 38 by a torsion bar 34. The torsion bar 34 prevents the top hinge from twisting relative to the bottom hinge and also allows for controlled flexibility on rough ground while at the same time assisting in keeping the fence upright and rigid.

Cooperating hinge components 24 are provided on upright 28 of frame 8 of fence section 4. The hinge components 24 comprises a pair of second sleeves 40 which are secured at vertically spaced location to the upright 28. A securing pin 36 is provided slightly above the top hinge component 24 and extends through a bore (not shown) in the upright 28. The securing pin 36 is biased through the bore by a leaf spring or spring wire 42 (FIG. 5).

In order to connect two fence units 2 together the ends of the two fence units 2 having the co-operating hinge components 22 and 24 are arranged adjacent to one another and the securing pin 36 is forced away from the top hinge component against the bias of spring 42 so that the connecting pins 32 may be placed within the second sleeves 40 whereafter the spring 42 is released so that the securing pin 36 is returned to its position above the top hinge component to prevent accidental disconnection of the two fence units.

The co-operating hinge components 22 and 24 allow a complete 360° swing of the two fence units relative to each other due to relative rotation being possible about either of two axes, the first being a vertical axis through the connecting pins 32 and the second being a longitudinal axis through the upright 38.

Accordingly a complete self supporting fence or yard may be formed by joining together a plurality of fence units 2, since the hinge 12 will allow the fence section 4 and 6 to open to a certain angle before being prevented from further swing by rod 20 and the hinge components 22 and 24 will allow a complete 360° swing so that the fence is always arranged on the ground in a zig-zag pattern as shown in FIG. 2.

Referring now to FIGS. 8 and 9, a trailer 50 which is towed by a vehicle 52 is proposed for allowing rapid erection and removal of the portable fence formed from fence units 2. A number of fence units are joined in the manner described above and are folded together by swinging the individual fence section 4 and 6 so that the fence forms a concertina type arrangement 54.

In order to unload the trailer one or two connected fence units are manually removed from the rear of the trailer 50, and placed on the ground. The trailer 50 is then towed forward by vehicle 52 (as shown in FIG. 8) so that the fence is unfolded off the rear of the trailer due to the dragging friction between the ground and the manually removed fence section and means (to be discussed hereinafter) provided on the trailer. After a few of the fence units have been dragged from the back of the trailer the weight of the fence units resting on the ground is sufficient to prevent any substantial movement of the fence units relative to the ground so that the trailer may then be driven along the course the proposed fence is to take. The fence is therefore conveniently deposited on the ground substantially in the position in which it is to be used.

In order to load the fence onto the trailer for transport the trailer is connected to the vehicle in the manner shown in FIG. 9 (to be more fully explained hereinafter) so that the vehicle 52 faces in the direction of the fence and the rear of the trailer is open in the direction of the fence. The vehicle may then be driven adjacent to the fence so that the fence is forced to fold up into the concertina arrangement 54 within the trailer 50.

With reference to FIG. 10, the trailer comprises a rectangular frame 56 of longitudinally running members 58 and cross-members 60. Two upper longitudinally running members 62 are joined to the outmost longitudinally running members 58 by posts 64. Wheels 66 and 67 are journelled to the ends of the central cross-member 60 for free rotation thereabout. The posts 64 at the front of the trailer 50 are higher than the remaining posts and are connected to an upper cross piece 68. An intermediate cross member (not shown) is provided between the posts 64 at the front of the trailer at the same height as the upper longitudinally running members 62.

The cross-member 68 and intermediate cross member provide a backing against which the fence folded in the concertina manner 54 may rest. The trailer 50 has a drawbar 70 which is journelled at one end of a bracket 72 on the central cross-member 60, so that the frame 56 is rotatable relative to the drawbar 70. The other end of the drawbar 70 has means for connection to a vehicle 52 and a ground engaging wheel 53. A support strut 74 is pivotally connected to a corner 76 of the trailer 50 and is releasably secured to the drawbar 70.

The drawbar 70 has a ratchet mechanism 78 thereon which comprises a rack 80 projecting upwardly from the drawbar and a collar 82 connected to the front cross member 60. The rack 80 projects through the collar 82 so that the frame 56 of the trailer may be tilted relative to the drawbar 70 (see FIG. 12) and held in the tilted position by the collar 82 which engages the teeth 84 of the rack 80.

The rear of the trailer 50 has two rollers 86 and 88 extending across the entire width thereof. The two rollers 86 and 88 are joined by a continuous belt or chain 90 which engages sprockets 92 and 94 provided on the end of the rollers 86 and 88 respectively. The other end of the roller 88 has a sprocket 98. A pulley 100 is journelled to a coupling bar 101 on the same side of the trailer as sprocket 98 and is movable by lever 102, also connected to coupling bar 101, into engagement with the wheel 66 of the trailer 50. The pulley 100 has a sprocket 104 connected to the inner end thereof. A continuous chain 106 engages the sprocket 104 and sprocket 98 so that when lever 102 is actuated to move pulley 100 into engagement with the rotating wheel 66 drive is transmitted via the sprocket 104, continuous chain 106 and sprocket 98 to the roller 88 and then from the roller 88 via sprocket 94, continuous chain 90 and sprocket 92 to the other roller 86.

Trailer 50 also has a second drawbar in the form of an arch member 110 which is pivotably connected to one of the outer-most longitudinal members 58 so that the arch member encloses the wheel 67 on the opposite side of the trailer to the wheel 66 which drives pulley 100. The arch member is pivotable from an operating position to a storage position 110′ (FIG. 13) and carries a connecting member 112 for connection to the vehicle 52. Preferably the connecting member 112 and the means for connection to a vehicle on the drawbar 70 is of the ball and socket type.

The upper longitudinal members 62 preferably have a number of pawls 114 for holding the fence sections 4 and 6 when in the folded arrangement on the trailer 50. The pawls as best shown in FIGS. 14 and 15 comprise a bracket 116 connected to upper longitudinal members 62 and an arm 118 pivotally connected at pivot 122 to the bracket 116. A handle 121 is connected to arm 118. The arm 118 is biased by a spring 120 so that it projects into the trailer 50 (as shown in FIG. 15) to hold fence sections 4 and 6 as they are successively loaded on to the trailer.

Guides 125 may be pivotally connected to posts 64 at the rear of the trailer. After the trailer has been loaded the guides may be closed to prevent the end fence section from falling off the trailer.

When the fences are to be unloaded the handle 121 is moved into the position shown in FIG. 14 so that the spring moves to the opposite side of pivot 122 to bias the arm 118 outwardly from the trailer to allow a clear path for the fence section to be drawn of the trailer. The trailer is then tilted into the position shown in FIG. 12 with the roller 86 in close proximity to the ground and held in such a position by means of the ratchet mechanism 78. With the pulley 100 not in engagement with wheel 66 and the first few fence sections are manually lifted from the trailer and placed on the ground. The vehicle 52 is then driven to tow the trailer in the direction of arrow B in FIG. 8 and 10. As the trailer moves fence sections are continuously dragged from the rear of the trailer by frictional engagement between the fence section and the ground.

As the fence sections are dragged from the rear of the trailer they form a zig-zag arrengement due to the hinges 12 (detailed with reference to FIG. 1 to 4) which preferably constitute every second connection between fence section 4 and 6, and prevents the fence sections from opening more than 160°.

To reload the trailer the pawls 114 are moved back into the position shown in FIG. 15 and with the trailer in the tilted position and with the pulley 100 in engagement with the wheel 66 the trailer is disconnected from the rear of the vehicle 52 and is placed along side the vehicle 52 with the rear of the trailer opening in the direction of the fence and the vehicle facing in the direction of the fence.

The arch member 110 is pivoted from its storage position 110' to the operating position and is connected by the connecting means 112 to the side of the vehicle 52.

The support strut 74 is disconnected from drawbar 70 and rotated about pivot connection 76 and connected to the ball provided at the rear of the vehicle.

The first fence sections may then be manually placed on the trailer and the vehicle is driven adjacent to the fence so that the fence sections are folded up on to the trailer with the assistance of rollers 86 and 88. Since the erected fence is in the zig-zag formation the individual fence sections readily fold into the concertina arrangements 54 at the rear (with the trailer oriented in the load position) on the trailer.

As the individual fence sections are folded onto the trailer they contact arm 118 of pawls 114 and push the arms 118 against the bias of the spring until the individual section has moved past the arm 118. The arm 118 is then forced back into the position shown in FIG. 15, and provides a stop for preventing the fence section from falling off the trailer. Once all the fence sections are loaded onto the trailer the guides 125 are closed and the fence loaded upon the trailer may be transported to another site.

Modifications may be made to the embodiment described with reference to the drawings. For example, a hydraulic motor may be used to drive the rollers 86 and 88 in place of the pulley 100. The hydraulic motor may be actuated from the vehicle 52 or a small engine provided on the trailer 50.

Further, instead of providing ratchet mechanism 78 to lift the trailer, the trailer may be hydraulically raised and lowered relative to the wheels 65 and 66 by the vehicle or the abovementioned small motor.

Pawls, similar to pawls 114 may be provided on the longitudinal members 58 in such a manner that the arms 118 may be raised above and lowered below the level of the longitudinal members 58. The provision of parts on the longitudinal members is advantageous if the trailer is to be used in rough terrain since the bottom of the fence section may otherwise tend to slide down the tilted trailer whilst the fence sections are being loaded onto the trailer.

The claims defining the invention are as follows:

1. A fence unit including at least two generally uniformly planar fence sections swingably connected end to end by connecting means enabling said fence sections to be swung into a position in which they are juxtaposed in substantially parallel planes to allow said fence sections to be folded, one of said fence sections having a rod adjacent the connecting means extending beyond the plane of said sections for limiting the amount of relative swing between said fence sections and to prevent the at least two fence sections from being extended to be parallel to each other whereby when said fence sections are opened to the limit allowed by said rod, said fence sections form between them a V-shape such that the fence unit is self supporting when placed on the ground.

2. A fence unit according to claim 1 wherein said rod is attached to or formed integrally with an end of one of said fence sections such that when said fence sections are opened said rod abuts an adjacent fence section to limit the amount of swing between said one of said fence sections and the adjacent fence section.

3. A fence unit according to claim 2 where said at least two fence sections are swingably connected by an upper and lower hinge.

4. A fence unit according to claim 3 wherein each of said fence sections has a frame defined by an inner upright member and a remote upright member joined by an upper and a lower horizontal member, each of said frames holding a wire mesh screen rigidly connected thereto.

5. A fence unit according to claim 4 wherein said upper and lower hinge each comprises a u-shaped member rigidly secured to one of said inner upright members and enclosing a portion of another of said inner upright members such that said another of said inner upright members is able to rotate within said u-shaped member to allow said one of said fence sections to swing relative to the adjacent fence section.

6. A fence unit according to claim 1 wherein said fence unit includes two fence sections.

7. A fence unit according to claim 1 wherein said fence sections have frames formed by an inner upright member and a remote upright member joined by an upper and a lower horizontal member; each of the two upright members includes one co-operating component of a two component hinge such that a plurality of fence units may be connected by joining the component on an end of a fence unit with the co-operating component on the opposite end of another fence unit.

8. A fence unit according to claim 7 wherein one co-operating component comprises two vertically spaced apart annular members each having a downwardly projecting connecting pin and the other co-operating component comprises two vertically spaced apart sleeves which when said fence units are joined each receive one of said downwardly projecting securing pins.

9. A fence unit according to claim 8 where said other component includes means for preventing spurious separation of the two component hinge; said means for preventing spurious separation comprising a securing pin biased over one of said annular members such that said securing pin may be forced away from said sleeve to allow the two component hinge to be joined, and the released to be biased back over said annular member to prevent spurious separation of the two component hinge.

10. A fence unit according to claim 8 where said two vertically spaced apart members are joined by a torsion rod which prevents relative rotation of the two vertically spaced apart members.

11. A fence unit according to claim 8 wherein said annular members surround one of said remote upright members for relative rotation therewith such that when said two component hinge is joined said two component hinge allows 360° relative swing between the joined fence units due to rotation taking place about two axes, a first axis being an axis through the two vertically spaced connecting pins and a second axis being a longitudinal axis through said one of said remote upright members.

12. A fence unit according to claim 1 wherein said rod is oriented substantially parallel to and is connected to an end of one of said fence sections.

13. A fence unit according to claim 1 wherein said stop means allows 160° swing between said one fence section and the adjacent fence section.

14. A fence unit including two generally uniformly planar fence sections swingably connected end to end by connecting means, one of said fence sections having a rod adjacent the connecting means extending beyond the plane of said sections for limiting the amount of relative swing between said fence sections, said fence sections having hinge means at remote ends thereof for allowing unrestricted swing between the remote ends of a similar fence unit when connected with said first mentioned fence unit whereby when said fence section are opened to the limit allowed by the rod, said fence sections form between them a V-shape such that the fence unit is self supporting when placed on the ground.

15. A fence unit according to claim 14, wherein remote ends of said fence section each have one component of a co-operating two component hinge to allow a plurality of fence units to be hinged together to form a fence.

16. A fence according to claim 15 wherein said fence units are connected such that the connection between the fence units allows 360° swing between the fence section of one of the fence units relative to the adjacent fence section of the adjacent fence unit.

17. A fence according to claim 15 wherein said fence in use forms a zig-zag arrangement which is self supporting when placed on the ground.

18. A fence according to claim 15 arranged to form a holding yard for animals.

19. A fence unit comprising:

at least two generally planar fence sections, each of said fence sections having a frame defined by an inner upright member and a remote upright member joined by an upper and a lower horizontal member, and each of said frames holding a wire mesh screen rigidly attached thereto;

an upper and a lower hinge swingably connecting said fence sections, wherein each of said hinges comprises a U-shaped member rigidly secured to a first one of said inner upright members of a first one of said fence sections and enclosing a portion of a second one of said inner upright members of an adjacent second one of said fence sections such that said second inner upright member is able to rotate within said U-shaped member to allow said first fence section to swing relative to said second fence section enabling said fence sections to be swung into a position in which they are juxtaposed in substantially parallel planes to allow said fence sections to be folded; and an end of one of said fence sections having stop means attached to or formed integrally therewith such that when said fence sections are opened, said stop means abut against an end of the other of said fence sections to limit the amount of relative swing between said fence sections whereby when said fence sections are opened to the limit allowed by said stop means, said fence sections form a V-shape such that said fence unit is self-supporting when placed on the ground.

20. A fence unit comprising:

at least two generally planar fence sections, each of said fence sections having a frame formed by an inner upright member and a remote upright member joined by an upper and a lower horizontal member;

hinge means including a first component on an end of one of said fence sections having two vertically spaced apart annular members, each having a downwardly projecting connecting pin, and a second component on an end of an adjacent one of said fence sections having two vertically spaced apart sleeves which receive said connecting pins enabling said fence sections to be swung into a position in which they are juxtaposed in substantially parallel planes to allow said fence sections to be folded;

a securing pin biased over one of said annular members such that said securing pin may be forced away from said sleeve to allow said first and second components of said hinge means to be joined, and then released to be biased back over said annular member to prevent spurious separation of said components; and an end of one of said fence sections having stop means for limiting the amount of relative swing between said fence sections and to prevent said fence sections from being brought into the same plane whereby when said fence sections are opened to the limit allowed by said stop means and said fence sections form a V-shape such that the fence unit is self-supporting when placed on the ground.

21. A fence unit comprising:

at least two generally planar fence sections, each of said fence sections having a frame formed by an inner upright member and a remote upright member joined by an upper and a lower horizontal member;

hinge means including a first component on an end of one of said fence sections having two vertically spaced apart annular members, each having a downwardly projecting connecting pin, and a second component on an end of an adjacent one of said fence sections having two vertically spaced apart sleeves which receive said connecting pins enabling said fence sections to be swung into a position in which they are juxtaposed in substantially parallel planes to allow said fence sections to be folded;

a torsion rod joining said vertically spaced apart annular members; and one of said fence sections having stop means for limiting the amount of relative swing between said fence sections and to prevent said fence sections from being brought into the same plane whereby when said fence sections are opened to the limit allowed by said stop means said fence sections form a V-shape such that the fence unit is self-supporting when placed on the ground.

22. A fence unit comprising:

at least two generally planar fence sections, each of said fence sections having a frame formed by an inner upright member and a remote upright member joined by an upper and a lower horizontal member;

hinge means including a first component on an end of one of said fence sections having two vertically spaced apart annular members, each having a downwardly projecting connecting pin, and a second component on an end of an adjacent one of said fence sections having two vertically spaced apart sleeves which receive said connecting pins enabling said fence sections to be swung into a position in which they are juxtaposed in substantially parallel planes to allow said fence sections to be folded;

said annular members surround one of said remote upright members for relative rotation therewith such that when said two component hinge means is joined together, said hinge means allows 360 degrees relative swing between said fence sections due to rotation taking place about two axes, a first axis being an axis through said two vertically spaced connecting pins and a second axis being a longitudinal axis through said one of said remote upright members, and one of said fence sections having stop means for limiting the amount of relative swing between said fence sections and to prevent said fence sections from being brought into the same plane whereby when said fence sections are opened to the limit allowed by said stop means said fence sections form a V-shape such that the fence unit is self-supporting when placed on the ground.

23. A fence unit according to claims 20 or 21 wherein said fence units are connected such that the connection between the fence units allows 360 degree swing between the fence section of one of the fence units relative to the adjacent fence section of the adjacent fence unit.

24. A fence unit according to claim 23 wherein said fence in use forms a zig-zag arrangement which is self-supporting when placed on the ground.

* * * * *